Patented Jan. 19, 1937

2,068,027

UNITED STATES PATENT OFFICE 2,068,027

PROCESS OF MAKING GLUCOSIDES FROM DIGITALIS PURPUREA

Friedrich Jäger, Mannheim, Germany, assignor to Rare Chemicals Inc., New York, N. Y.

No Drawing. Application May 9, 1935, Serial No. 20,644

4 Claims. (Cl. 87—28)

My invention relates to a new glycosid preparation recovered from foxglove (*Digitalis purpurea*), which is distinguished from the preparations hitherto known by greater purity and higher efficiency. The invention also includes the process for making the new preparation.

As is well known to those skilled in the art, the leaves of foxglove contain different glycosids exerting a stimulating action on the heart. These glycosids are isolated by the pharmaceutical industry from the drug according to different processes either singly or mixed to one another. Amongst the preparations obtainable by extraction of the foxglove leaves the so-called gitalin constituent is distinguished by its comparatively high solubility in water and a particularly quick action at oral or rectal administration. This gitalin constituent of the foxglove leaves is recovered by extracting the leaves with water, care being taken to avoid heating beyond 30° C. when extracting as well as during the further treatment, as long as water is present. In order to free the aqueous extract from impurities and ballast matter, the extract is treated with lead salts and more especially with acetate of lead, whereupon the solution, after having been filtered, is freed from lead with the aid of salts of sulfuric acid. On the solution, freed from ballast matter and lead ions, being shaken with chloroform, the constituents possessing a cardiac stimulating effect dissolve in the chloroform and may be recovered therefrom in solid form by precipitation with petrol ether, preferably after the chloroform solution has been concentrated in vacuo.

If one proceeds in a different manner, using for instance for the extraction of the drug organic solvents as such or diluted with water, or if the process is carried out at temperatures above 30° C., one does not recover the gitalin constituents of digitalis, but other glycosids or mixtures of such, which differ from the gitalin constituent of digitalis as well regarding their physical and chemical properties, as also regarding their toxicity and other physiological action.

I have now found that the process of recovering the gitalin constituent can be rendered simpler in technical respect and consequently also more economical, if the extraction of the leaves of the drug and the purification of the extract by means of solutions of lead salts is not carried out in two stages, one after the other, but the drug is directly extracted with a solution of acetate of lead.

That this way of proceeding would lead to success, could not be foreseen. For it is not only surprising that the presence of a salt in the aqueous extraction agent does not hinder the solution of the gitalin constituent of digitalis, but it is still more astonishing that, when combining the extraction and purification phases into a single operation, a still better yield of the gitalin constituent is obtained, than with the stagewise extracting with water and subsequent purification of the extract with solutions of lead salts. Probably the better yield may be due to the circumstance that in the known treatment of the aqueous extract with a solution of a lead salt the ballast matter and lead compounds, which are thus precipitated, carry down part of the gitalin constituent in a form in which it can not be redissolved or can only be incompletely redissolved from the precipitates when they are washed out.

I have further found that the products of the present process, while corresponding altogether to the products of the known process hitherto practiced, as far as their physical and chemical properties and the kind of physiological action is concerned, are advantageously distinguished from the prior products by their greater purity, being almost colorless and showing only an infinitely slight yellow tinge, and further that even a quantity of less than 0.8 milligrams produces the effect of 100 frog doses, calculated according to the so-called timeless method, wherein 1 frog dose is the quantity that kills 1 gram frog. In carrying through the new process temperatures above 30° C. should again be avoided when extracting the leaves and when treating the extracts further in a known manner, more especially as long as water is present.

In practicing my invention, I may for instance proceed as follows:—

Into a solution of 15 kilograms acetate of lead in 300 litres water, which, if tested with litmus, shows a neutral or at the utmost a very slight acid reaction, there are introduced gradually under stirring at a temperature of about 20° C. 30 kilograms ground leaves of *Digitalis purpurea* (foxglove). While maintaining the temperature constant, stirring is continued during about 12 hours, whereupon the solution is removed from the extracted leaves in a fruit press (spindle press). The solution thus recovered is now freed from lead by treating it with a concentrated aqueous solution of crystallized sodium sulfate (Glauber's salt), care being taken to avoid the addition of greater percentages of sodium sulfate in excess and to make sure by suitable tests that on the addition of further quantities of sodium sulfate solution the solution separated from the lead sulfate precipitate does not form any further precipitate. When the lead has been completely precipitated, it is thoroughly separated from the solution by filtration in a filter press and the clear solution is now extracted six times in succession, each time with 11 kilograms chloroform, which are throughly admixed to it. The combined chloroform extracts are first shaken with dry soda, thereupon carefully dried with anhydrous sodium sulfate and now carefully concentrated in a vacuum of about 60 millimetres mercury column and in a water bath, the temperature of which should not rise beyond 40° C., until a residue weighing about 0.8 to 0.85 kilograms is obtained. By gradually running the concentrated chloroform solution, which has been allowed to rest during several days and has thereafter been filtered, into three times its quantity of petrol ether under stirring, the gitalin fraction of digitalis is now precipitated. The precipitated product is filtered by vigorous suction to separate it from the mother liquor and is washed with low boiling petrol ether until an altogether colorless filtrate is obtained. After drying and triturating an almost colorless powder is obtained, the yield being about 0.3% of the starting material. This yield is about 50% higher than the yield of a slightly darker colored product obtainable by extracting the leaves only with water and thereafter purifying the aqueous extract with acetate of lead.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim in the present application to any modification not covered by these claims is expressly reserved.

I claim:—

1. In the art of preparing glycosids, the process which comprises extracting the leaves of *Digitalis purpurea* (foxglove) at a temperature below 30° C. with an aqueous solution of acetate of lead.

2. In the art of preparing glycosids, the process which comprises extracting the leaves of *Digitalis purpurea* (foxglove) at a temperature below 30° C. with an aqueous solution of acetate of lead, treating the extract with a precipitant for lead and extracting the aqueous solution with chloroform.

3. In the art of preparing glycosids, the process which comprises extracting the leaves of *Digitalis purpurea* (foxglove) at a temperature below 30° C. with an aqueous solution of acetate of lead, treating the extract with a precipitant for lead, extracting the aqueous solution with chloroform, drying this extract, concentrating same at a temperature below 30° C. in vacuo and precipitating the glycosid in the concentrated solution.

4. In the art of preparing glycosids the process which comprises agitating comminuted leaves of *Digitalis purpurea* (foxglove) at a temperature below 30° C. in a substantially neutral aqueous solution containing about 4.2% acetate of lead, precipitating the filtered solution with sodium sulfate, filtering, extracting the filtrate with chloroform, concentrating the extract in vacuo at a temperature below 30° C., running the concentrated extract into petrol ether to precipitate the glycosid and filtering, washing and drying same.

FRIEDRICH JÄGER.